(12) United States Patent
Fenny et al.

(10) Patent No.: US 11,970,277 B2
(45) Date of Patent: *Apr. 30, 2024

(54) HYBRID PROPULSION DRIVE TRAIN SYSTEM FOR TILTROTOR AIRCRAFT

(71) Applicant: Textron Innovations Inc., Providence, RI (US)

(72) Inventors: Carlos Alexander Fenny, Fort Worth, TX (US); John Robert Wittmaak, Jr., Newark, TX (US); Mike John Ryan, Colleyville, TX (US); Joseph Scott Drennan, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,997

(22) Filed: Jun. 28, 2023

(65) Prior Publication Data

US 2023/0356851 A1 Nov. 9, 2023

Related U.S. Application Data

(63) Continuation of application No. 15/896,383, filed on Feb. 14, 2018, now Pat. No. 11,731,772.

(Continued)

(51) Int. Cl.
*B64D 27/24* (2024.01)
*B64C 29/00* (2006.01)
(Continued)

(52) U.S. Cl.
CPC .......... *B64D 27/24* (2013.01); *B64C 29/0033* (2013.01); *F01D 15/10* (2013.01);
(Continued)

(58) Field of Classification Search
CPC .. B64D 27/24; B64D 27/20; B64D 2027/026; B64C 29/0033; F02C 6/00; F02C 6/02
See application file for complete search history.

(56) References Cited

U.S. PATENT DOCUMENTS

| 4,504,029 A | 3/1985 | Erickmann |
| 4,856,732 A | 8/1989 | Eickmann |

(Continued)

FOREIGN PATENT DOCUMENTS

| CA | 2997285 C | 2/2023 |
| CN | 101535123 A | 9/2009 |

(Continued)

OTHER PUBLICATIONS

Canadian Intellectual Property Office, Examination Report for Canadian Patent Appl. 2,997,285 dated Apr. 2, 2019—4 pp.

(Continued)

*Primary Examiner* — Richard Green
*Assistant Examiner* — Arfan Y. Sinaki
(74) *Attorney, Agent, or Firm* — Daniel J. Chalker; Edwin S. Flores; Chalker Flores, LLP

(57) ABSTRACT

The present invention includes a hybrid propulsion system for an aircraft comprising: an engine disposed within a fuselage of the aircraft, two electrical generators disposed within the fuselage and connected to the engine, and two nacelles. Each nacelle comprises a proprotor, and each nacelle houses two electric motors connected to the proprotor. Each electrical generator is connected to the two electric motors in each nacelle. The proprotors provide lift for vertical takeoff and landing in a helicopter mode. A fan is coupled to the fuselage and connected to two additional electric motors. Each additional electric motor is connected to one of the two electric generators. The fan provides thrust for forward flight during an airplane mode. The airplane (Continued)

mode includes increasing power to the fan while decreasing power to the proprotors to zero.

20 Claims, 11 Drawing Sheets

Related U.S. Application Data

(60) Provisional application No. 62/465,934, filed on Mar. 2, 2017.

(51) Int. Cl.
  B64D 27/02 (2006.01)
  F01D 15/10 (2006.01)

(52) U.S. Cl.
  CPC ...... *B64D 27/026* (2024.01); *F05D 2220/328* (2013.01); *F05D 2220/76* (2013.01); *Y02T 50/60* (2013.01)

(56) References Cited

U.S. PATENT DOCUMENTS

| | | | |
|---|---|---|---|
| 4,982,914 A | 1/1991 | Eickmann | |
| 6,644,588 B2 | 11/2003 | King | |
| 6,729,575 B2 | 5/2004 | Bevilaqua | |
| 7,571,879 B2 | 8/2009 | Builta | |
| 9,776,714 B2 | 10/2017 | Shapery | |
| 10,000,293 B2 | 6/2018 | Hamel | |
| 10,071,801 B2 | 9/2018 | North | |
| 10,082,040 B2 | 9/2018 | Gallet | |
| 2007/0034739 A1 | 2/2007 | Yoeli | |
| 2009/0224096 A1 | 9/2009 | Waide | |
| 2011/0024555 A1 | 2/2011 | Kuhn, Jr. | |
| 2012/0292456 A1* | 11/2012 | Hollimon | B64C 27/28 416/142 |
| 2014/0103158 A1 | 4/2014 | Berry | |
| 2016/0200436 A1 | 7/2016 | North | |
| 2016/0229532 A1 | 8/2016 | Shapery | |
| 2016/0244158 A1 | 8/2016 | Fredericks | |
| 2018/0051654 A1* | 2/2018 | Suciu | B64C 11/46 |
| 2018/0170564 A1 | 6/2018 | Vaillant | |
| 2018/0229606 A1* | 8/2018 | Vondrell | H02P 9/04 |
| 2018/0251226 A1 | 9/2018 | Fenny | |
| 2020/0148375 A1 | 5/2020 | Huang | |

FOREIGN PATENT DOCUMENTS

| | | |
|---|---|---|
| CN | 102905972 A | 1/2013 |
| CN | 105752345 A | 7/2016 |
| CN | 108528734 A | 9/2018 |
| EP | 356541 A1 | 3/1990 |
| EP | 3360781 A1 | 8/2018 |
| EP | 3369655 A1 | 9/2018 |
| WO | 2015138217 A1 | 9/2015 |

OTHER PUBLICATIONS

Canadian Intellectual Property Office, Examination Report for Canadian Patent Appl. 2,997,285 dated Jan. 21, 2020—4 pp.
Canadian Intellectual Property Office, Examination Report for Canadian Patent Appl. 2,997,285 dated Sep. 2, 2020—5 pp.
Canadian Intellectual Property Office, Examination Report for Canadian Patent Appl. 2,997,285 dated Apr. 15, 2021—5 pp.
Canadian Intellectual Property Office, Examination Report for Canadian Patent Appl. 2,997,285 dated Nov. 19, 2021—4 pp.
China National Intellectual Property Administration, Examination Report for Chinese Appl. No. 201810175125.6 dated Jan. 4, 2021, 22 pp (with English Summary).
China National Intellectual Property Administration, Examination Report for Chinese Appl. No. 201810175125.6 dated Aug. 26, 2021, 7 pp (with English Summary).
European Patent Office, European Search Report for EP Application No. 18157978.0 dated Apr. 16, 2018, 5 pp.
European Patent Office, Communication pursuant to Article 94(3) EPC for EP Application No. 18157978.0 dated May 8, 2018, 6 pp.
European Patent Office, Communication pursuant to Article 94(3) EPC for EP Application No. 18157978.0 dated Oct. 23, 2018, 6 pp.
Goncalves, Sarah "DARPAs Experimental VTOL Plane Looks like the Osprey of Tomorrow" Aug. 3, 2016, oo 1-2, XP055462683, Retrieved from the Internet: URL:https://www.ecnmag.com/glob/2016/03/darpas-experimental-vtol-plane-looks-osprey-tomorrow.

* cited by examiner

HYBRID PROPULSION DRIVE TRAIN SYSTEM FOR TILTROTOR AIRCRAFT

CROSS-REFERENCE TO RELATED APPLICATIONS

This patent application is a continuation of U.S. patent application Ser. No. 15/896,383 filed on Feb. 14, 2018 entitled Hybrid Propulsion Drive Train System for Tiltrotor Aircraft", which claims priority to U.S. provisional patent application Ser. No. 62/465,934 filed on Mar. 2, 2017 entitled "Hybrid Propulsion Drive Train System for Tiltrotor Aircraft," all of which are hereby incorporated by reference in their entirety.

STATEMENT OF FEDERALLY FUNDED RESEARCH

Not applicable.

TECHNICAL FIELD OF THE INVENTION

The present invention relates in general to the field of aircraft, and more particularly, to a hybrid propulsion system for tiltrotor aircraft.

BACKGROUND OF THE INVENTION

Without limiting the scope of the invention, its background is described in connection with tiltrotor aircraft.

U.S. Pat. No. 7,571,879, issued to Builta, et al., is entitled "Automatic conversion system for tiltrotor aircraft", and teaches a method for automatically controlling the conversion of a tiltrotor aircraft. An airspeed command for the tiltrotor aircraft is received. The airspeed command is converted to a pylon position, wherein a difference between the airspeed command and a measured airspeed is calculated. The difference between the airspeed command and a measured airspeed is converted to a dynamic pylon position, and a total pylon position is calculated from the pylon position and the dynamic pylon position. A pylon of the tiltrotor aircraft is moved to the total pylon position. Another embodiment of the present invention is a system for calculating a position of a pylon of a tiltrotor aircraft based on an airspeed command. The system includes an airspeed command module, a pylon trim position module, a dynamic pylon position module, and a pylon position module.

U.S. Pat. No. 6,644,588, issued to King, et al., is entitled, "Multi-mode tiltrotor nacelle control system with integrated envelope protection," and teaches a tiltrotor aircraft that has a multi-mode tiltrotor nacelle control system with integrated envelope protection. The tiltrotor aircraft has a fuselage, a tail section, a left wing member, a right wing member, a right engine nacelle, a left engine nacelle, a left proprotor, and a right proprotor. Activation of the nacelle control system causes preselected rotational movement of the tiltrotor assembly.

SUMMARY OF THE INVENTION

In one embodiment, the present invention includes a hybrid propulsion system for an aircraft comprising: an engine disposed within a fuselage of the aircraft, two electrical generators disposed within the fuselage and connected to the engine, and two nacelles. Each nacelle comprises a proprotor, and each nacelle houses two electric motors connected to the proprotor. Each electrical generator is connected to the two electric motors in each nacelle. The proprotors provide lift for vertical takeoff and landing in a helicopter mode. A fan is coupled to the fuselage and connected to two additional electric motors. Each additional electric motor is connected to one of the two electric generators. The fan provides thrust for forward flight during an airplane mode. The airplane mode includes increasing power to the fan while decreasing power to the proprotors to zero.

In one aspect, each of the two nacelles are rotatable. In another aspect, the engine is a turboshaft engine, high bypass engine or distributed engine. In another aspect, a reduction gearbox is positioned between the engine and the two electrical generators. In another aspect, a proprotor reduction gearbox is positioned between the two electrical motors and the proprotor of each nacelle. In another aspect, the proprotors are driven directly by the two electrical motors. In another aspect, the engine is not mechanically connected to the fan.

In another embodiment, the present invention includes a method of providing propulsion to an aircraft comprising: providing an engine disposed within a fuselage of the aircraft; providing two electrical generators disposed within the fuselage and connected to the engine; providing two nacelles, each nacelle comprising a proprotor, and each nacelle housing two electric motors connected to the proprotor; providing a fan coupled to the fuselage and connected to two additional electric motors, and each additional electric motor connected to the two electric generators; driving the two electrical generators with the engine; generating an electrical power from the two electrical generators; transmitting the electrical power to the electric motors in the nacelles; rotating the proprotors using the electrical motors in the nacelles to provide lift for vertical takeoff and landing in a helicopter mode; and rotating the fan using the additional electric motors to provide thrust for forward flight during an airplane mode, wherein the airplane mode includes increasing power to the fan while decreasing power to the proprotors.

In one aspect, each of the two nacelles are rotatable. In another aspect, the engine is a turboshaft engine, high bypass engine or distributed engine. In another aspect, the method further comprises providing a reduction gearbox positioned between the engine and the two electrical generators. In another aspect, the method further comprises providing a proprotor reduction gearbox positioned between the two electrical motors and the proprotor of each nacelle. In another aspect, the proprotors are driven directly by the two electrical motors. In another aspect, the engine is not mechanically connected to the fan.

In yet another embodiment, the present invention includes a hybrid propulsion system for an tiltrotor craft comprising: a fuselage, an engine disposed within the fuselage, two electrical generators disposed within the fuselage, each electrical generator connected to the engine, two wings connected to the fuselage, and two rotatable nacelles. Each rotatable nacelle disposed on a respective wing and comprising: a proprotor disposed at a forward end of the rotatable nacelle to provide lift for vertical takeoff and landing and for stationary flight in a helicopter mode and thrust for forward flight in a first airplane mode, and to provide a reduced thrust during a second airplane mode; and two electric motors disposed within the rotatable nacelle and connected to the proprotor, each electric motor connected to the two electric generators. A fan is disposed within the fuselage and connected to two additional electric motors disposed within the fuselage, each additional electric motor connected to the two electric generators, wherein the fan is powered and provides forward thrust for forward flight during the second airplane mode. The first airplane mode is converted to the second airplane mode by increasing power to the fan while decreasing power to the proprotors to zero. The second airplane mode is converted to the first airplane mode by decreasing power to the fan while increasing power to the proprotors.

In one aspect, the engine is a turboshaft engine, high bypass engine or distributed engine. In another aspect, a reduction gearbox is positioned between the engine and the two electrical generators. In another aspect, a proprotor reduction gearbox is positioned between the two electrical motors and the proprotor of each nacelle. In another aspect, the proprotors are driven directly by the two electrical motors. In another aspect, the engine is not mechanically connected to the fan.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
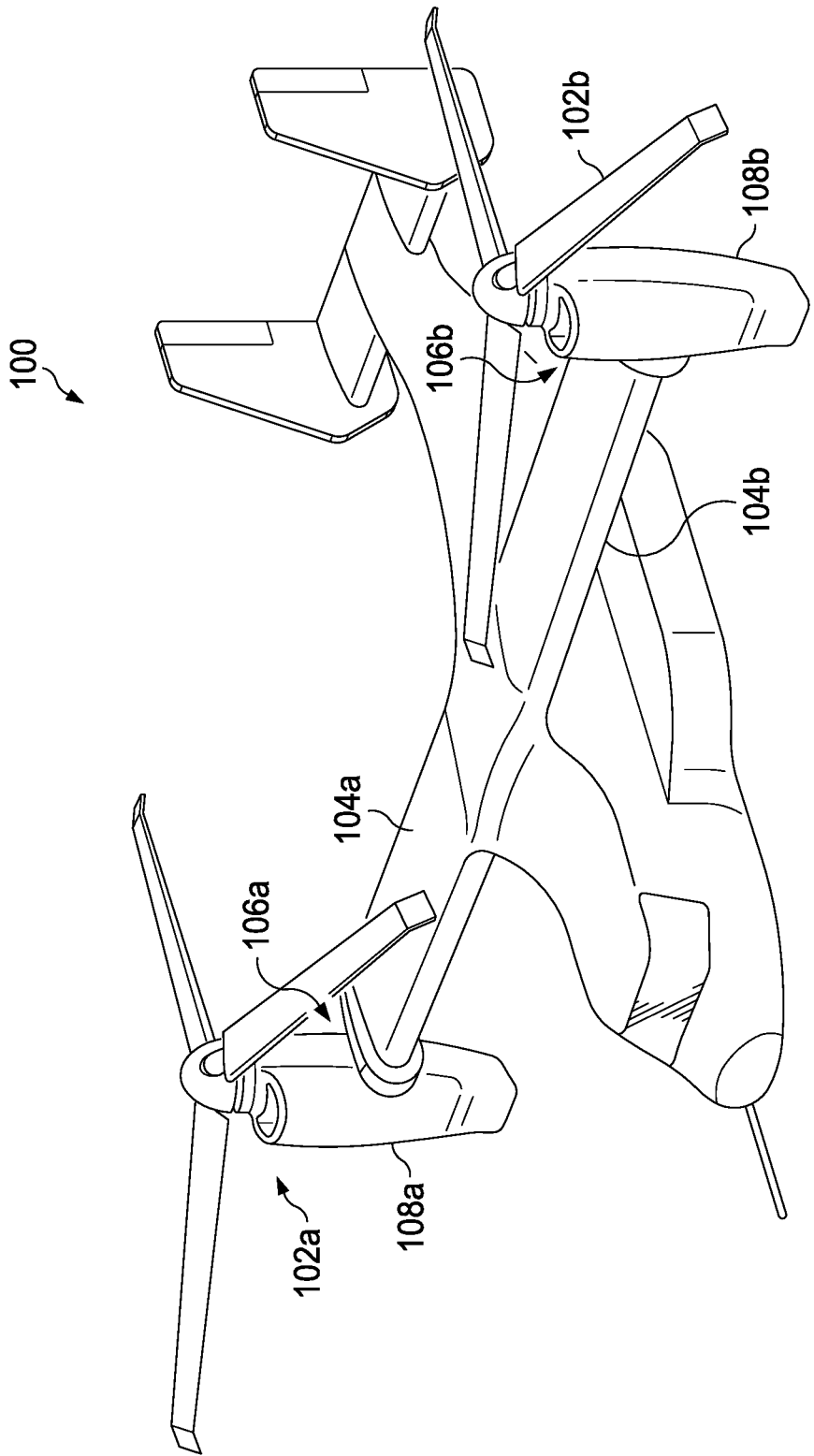
FIG. 1 shows a perspective view of a tiltrotor aircraft that can use the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various aspects of components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Helicopters are incredibly useful aircraft allowing for vertical takeoff, hovering and vertical landing. However, helicopter speed and range performance falls far short of that provided by conventional fixed wing airplanes. The development of tiltrotor technology has increased the speed rotorcraft speed to over 300 MPH (482 KPH) and extended range to approach the performance of conventional turboprop aircraft. Tiltrotor speed performance still falls short of what can be achieved by conventional jet propulsion aircraft.

Jet fighter/attack aircraft such as the AV-8B Harrier and F-35 Lightning utilize jet thrust to provide vertical takeoff, hovering and vertical landing, and can obtain speeds of over 600 MPH (965 KPH). But the penalty for using jet thrust to provide vertical lift is dramatically reduced useful payload and range performance. Reduced payload and range performance is a direct consequence of the high disc loading (projected area of lift thrust) when using jet thrust to provide vertical lift. The relatively low disc loading of helicopters and tiltrotors allows for efficient vertical lift.

In a conventional tiltrotor, a mechanical propulsion system drive train provides necessary safety, reliability, and operating performance at an acceptable weight. However, to support the unique operating requirements for a stop-fold tilt rotor, the addition of a high speed clutch, rotor phasing unit, and convertible engine can result in unacceptable loss of propulsion system reliability and an undesirable increase in aircraft weight.

The hybrid propulsion system of the present invention can use a stop-fold proprotor, for conversion between helicopter and airplane modes by rotation of the pylons. With the stop fold tiltrotor operating in airplane mode, aircraft speed is increased further as the convertible engine transitions into a turbo jet to provide forward thrust and the rotors are slowed to a stop. Once the rotors are stopped they are folded back against the pylons to reduce aerodynamic drag and permit additional increase in speed.

FIG. 1 shows a tiltrotor aircraft 100 that utilizes the system in accordance with the present application. Tiltrotor aircraft 100 includes tilt rotor assemblies 102a and 102b that are carried by wings 104a and 104b, and are disposed at end portions 106a and 106b of wings 104a and 104b, respectively. Tilt rotor assemblies 102a and 102b include nacelles 108a and 108b, which carry the engines and transmissions of tiltrotor aircraft 100. Tilt rotor assemblies 102a and 102b move or rotate relative to wing members 104a and 104b between a helicopter or hover mode in which tilt rotor assemblies 102a and 102b are tilted upward, such that tiltrotor aircraft 100 flies like a conventional helicopter; and an airplane or cruise mode in which tilt rotor assemblies 102a and 102b are tilted forward, such that tiltrotor aircraft 100 flies like a conventional propeller driven aircraft.

Figure 2:
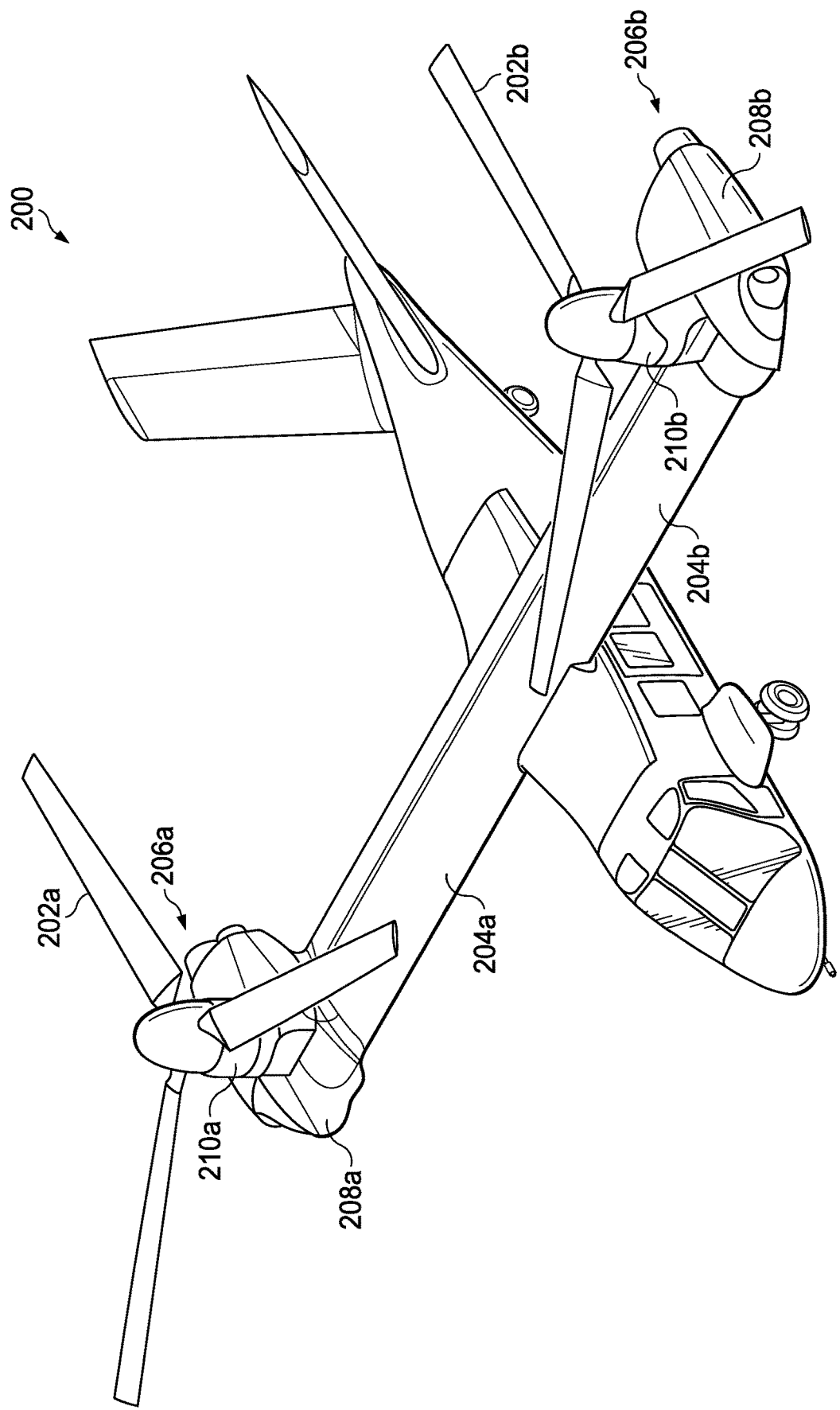
FIG. 2 shows a perspective view of another tiltrotor aircraft that can also use the present application.

FIG. 2 shows another tiltrotor aircraft 200 that utilizes the system in accordance with the present application. Tiltrotor aircraft 200 includes tilt rotor assemblies 202a and 202b that are carried by wings 204a and 204b, and are disposed at end portions 206a and 206b of wings 204a and 204b, respectively. Tilt rotor assemblies 202a and 202b include nacelles 208a and 208b, which include the engines and transmissions of tiltrotor aircraft 200. In this embodiment, the engines are fixed to the wing and do not rotate, rather, only the pylons 210a and 210b with the tilt rotor assemblies 202a and 202b rotate. Tilt rotor assemblies 202a and 202b move and rotate relative to wing members 204a and 204b and the nacelles 208a and 208b. The tilt rotor assemblies 202a and 202b do not more relative to the wing members 204a and 204b. Instead, during the transition between a helicopter or hover mode only the pylons 210a and 210b with the tilt rotor assemblies 202a and 202b rotate to redirect the thrust from the tilt rotor assemblies 202a and 202b. The tiltrotor aircraft 200 is still able to fly like a conventional helicopter; and an airplane or cruise mode in which one of the rotors are tilted forward, such that tiltrotor aircraft 200 flies like a conventional propeller driven aircraft.

The invention of a hybrid propulsion drive train system for tiltrotor aircraft, which can be a stop-fold tiltrotor aircraft, that resolves the reliability and weight penalties of a mechanical propulsion system drive train by replacing gearboxes, drive shafts, clutches, and phasing units with redundant high-speed electric motors, electric generators and multiple electrics power distribution busses. Alternatively, the hybrid propulsion drive train system may be configured using redundant high-speed hydraulic motors, hydraulic pumps and multiple hydraulic power distribution systems. The skilled artisan will recognize that a combination of both the electric and hydraulic system may also be used in certain configurations.

Hybrid propulsion as configured in this invention eliminates the use of gearboxes and drive shafts to distribute power from the engine to the prop rotors. In one example, a turbo shaft engine is connected to a reduction gearbox that drives redundant electric generators (e.g., high-speed electric generators) or hydraulic pumps to provide electric or hydraulic power, respectively. Power from the electric generators or hydraulic pumps is conveyed, respectively, to electric or hydraulic motors on the pylons that drive the proprotor gearboxes via multiple electrics power distribution busses or multiple hydraulic power distribution systems. The application of redundant electric and/or hydraulic power distribution systems supports required safety/reliability requirements while providing for simplified airframe routing over mechanical drive shafts. The hybrid power drive train system provides for variable speed operation of the rotors down to zero RPM, thus, the requirement for a high-speed clutch and a rotor-phasing unit is eliminated. As such, the present invention includes a hybrid propulsion drive train system that does not include or require a high-speed clutch and/or a rotor-phasing unit.

A major impediment to the development of a tiltrotor aircraft, such as a stop-fold tiltrotor aircraft, is the absence of an existing convertible engine capable of continuous overlapping transition between turbo-shaft and turbo-jet operating modes. The hybrid propulsion drive train system for tiltrotor aircraft of the present invention utilizes existing internal combustion, jet, or turbo shaft engine technology, thereby the eliminating the requirement for a convertible engine.

In modern high bypass jet engines, the majority of the thrust is generated from a ducted fan in front of the engine, not from the flow of hot combustion gases passing through the engine as with early jet engines. Very large air-flow at relatively low differential to aircraft speed generated by the high bypass configuration increases engine efficiency, resulting in reduced fuel consumption. This is why commercial jet aircraft nacelles have grown in diameter with the demand for increased fuel efficiency. The greater the volume of bypass air, the greater the engine efficiency.

To increase propulsion efficiency it is now possible to separate the fan from the engine completely, thus, locating the individual components in the aircraft to maximize aerodynamic efficiency and provide for variable fan speed operation. This is commonly known as "distributed propulsion". Power generated from engines, such as a turbo shaft engine, is transmitted to the ducted fans utilizing electric generators on the engine to power electric motors on the variable speed ducted fans.

Figure 3A:
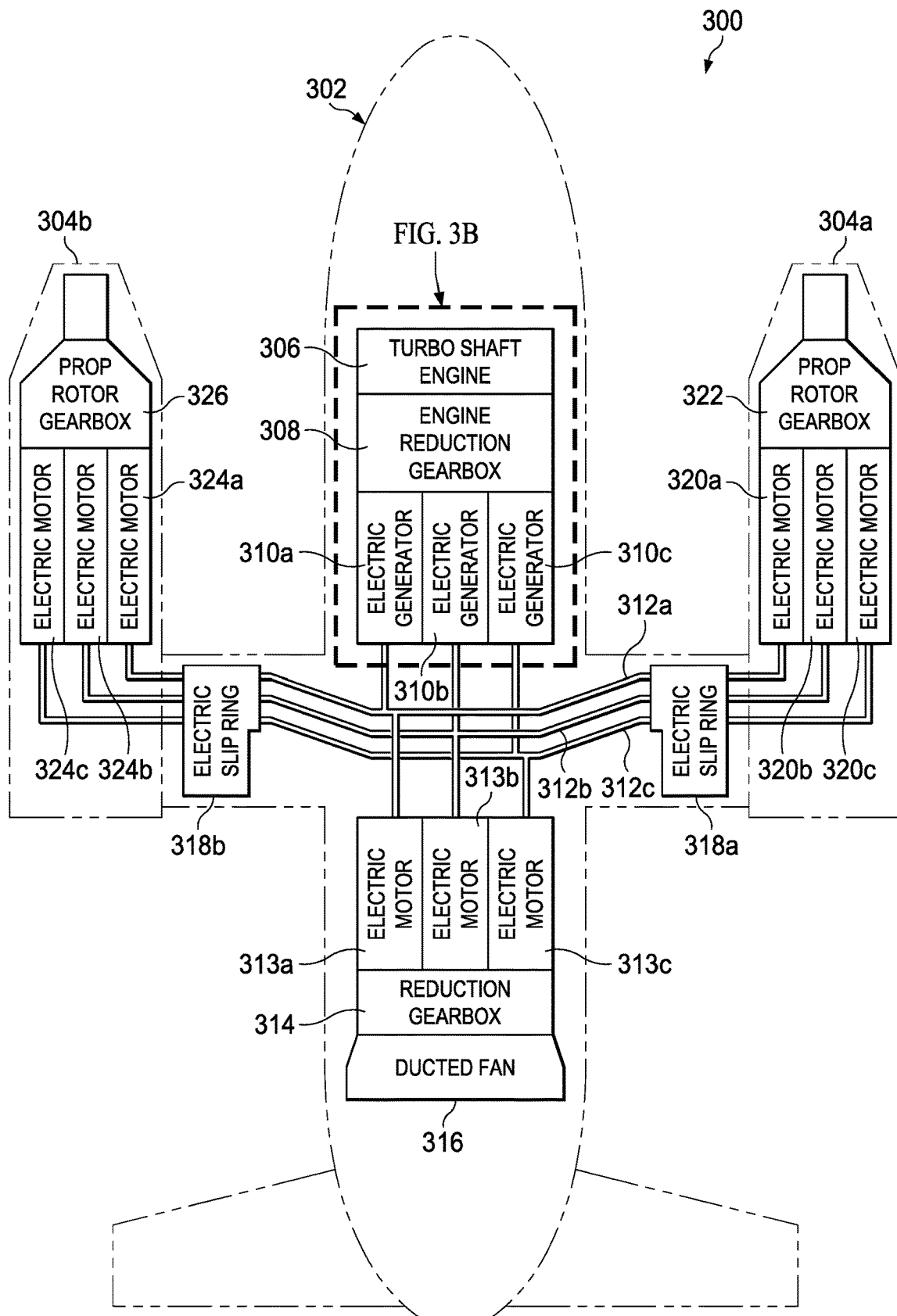
FIGS. 3A and 3B show top views of a tiltrotor high speed motor hybrid electric propulsion system of the present invention.
Figure 3B:
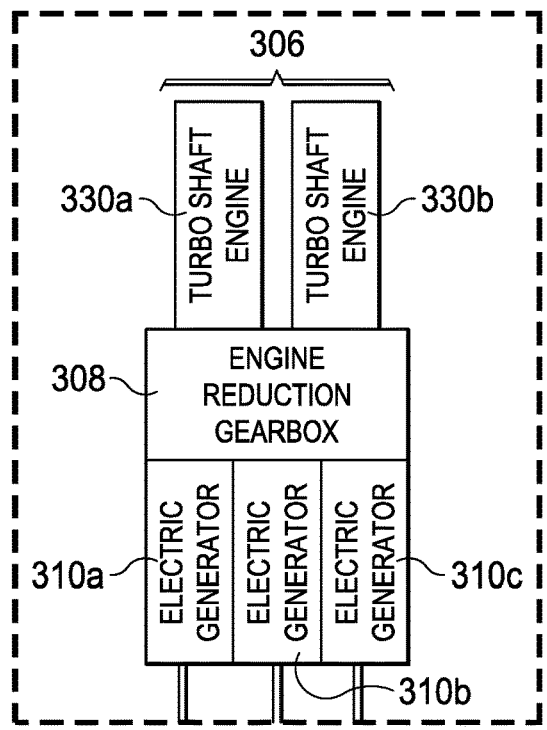

FIG. 3A shows a top-view of an electric hybrid propulsion drive train system of the present invention that incorporates distributed propulsion to provide thrust for high speed and efficient forward flight using ducted fans. Aircraft 300 is depicted having a fuselage 302 and nacelles 304a, 304b. The fuselage 302 includes one or more engines 306, which is depicted in this embodiment as a single turbo shaft engine that is connected to an engine reduction gearbox 308. Of course, the skilled artisan will recognize that for purposes of redundancy the aircraft 300 can include more than one engine as depicted in the insert. The engine reduction gearbox 308 connected to one or more electric generators (in this version three electric generators 310a, 310b, and 310c are depicted) that convert shaft power from the turbo shaft engine 306 into electrical power. The electric generators 310a, 310b, and 310c are connected, respectively, to power conduits 312a, 312b, 312c. Power conduit 312a is connected to electric motors 313a, 320a and 324a. Power conduit 312b is connected to electric motors 313b, 320b and 324b. Power conduit 312c is connected to electric motors 313c, 320c and 324c. In certain embodiments, the aircraft 300 may be a tiltrotor aircraft and the nacelles 304a, 304b tilt, which can require, e.g., an electric slip ring 318a, 318b, respectively, to connect power conduits 312a, 312b, 312c to the respective electric motors. It is possible that the various electric generators 310a, 310b, 310c, power a single large electric motor, however, for applications in which redundancy is preferred (such as manned aircraft), it will be common to include 1, 2, 3, 4, or more electric motors. The number of electric motors can be optimized by factoring the weight of the electric motor, the speed of the electric motor, the torque of the electric motor, the weight of the aircraft, etc. In this embodiment, the electric motors 313a, 313b, and 313c are depicted as driving a reduction gearbox 314 that connected to a ducted fan 316 that is used to provide additional thrust to the aircraft 300. While the ducted fan 316 is depicted in this embodiment as being in the back of the aircraft 300, the skilled artisan will recognize that it may be positioned in front of the engine 306, adjacent to the engine 306 or may include more than one ducted fan 316, such as 1, 2, 3, 4, or more ducted fans. Turning to each of the nacelles 304a, 304b, each is depicted with three electric motors, however the skilled artisan will recognize that the number of electric motors can be varied depending on power-to-weight curves or restrictions, such as 1, 2, 3, 4, or more electric motors. The electric motors 320a, 320b, and 320c are depicted in nacelles 304a connected to drive a prop rotor gearbox 322 that turns a proprotor (not depicted). Likewise, the electric motors 324a, 324b, and 324c are depicted in nacelles 304b to connect to and drive a prop rotor gearbox 326 that turns a proprotor (not depicted). Thus, the two nacelles 304a, 304b are used in a traditional manner as with all tiltrotor or vertical take off and landing craft to provide lift when the proprotors are parallel to the ground and upon take off will rotate to a position generally perpendicular to the flight during forward flight providing thrust. In certain embodiments, such as when the proprotors are foldable during flight, the proprotors may be used primarily for the initial take-off and landing, but the ducted fan 316 may provide addition thrust or be the primary or sole source of thrust during forward flight. FIG. 3B shows the turbo shaft engine 306 in an expanded view that depicts two turbo shaft engines 330a, 330b, that connect to the engine reduction gearbox 308. The aircraft 300 may include 1, 2, 3, 4, or more engines. Of course, in certain embodiments the engines may be conventional jet engines or even standard combustion engines, so long as they provide shaft power to drive the reduction gearbox 314 that provides power to ducted fan 316.

Figure 4B:
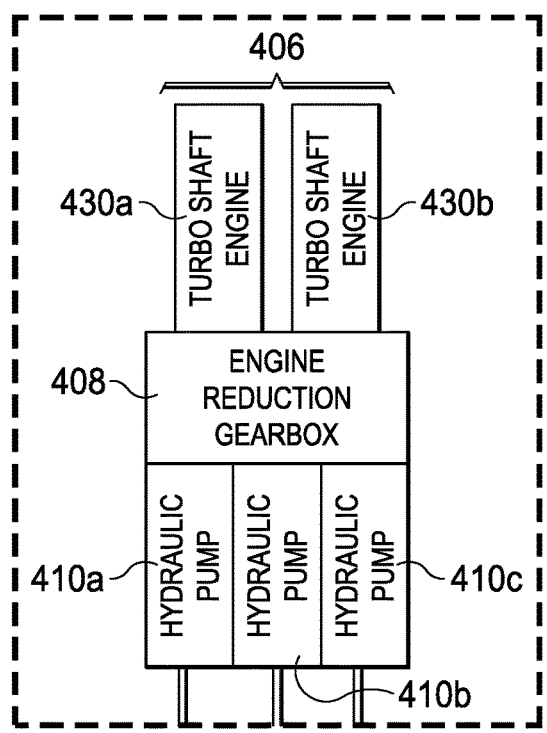
FIGS. 4A and 4B show top views of a tiltrotor high speed motor hybrid hydraulic propulsion system of the present invention.
Figure 4A:
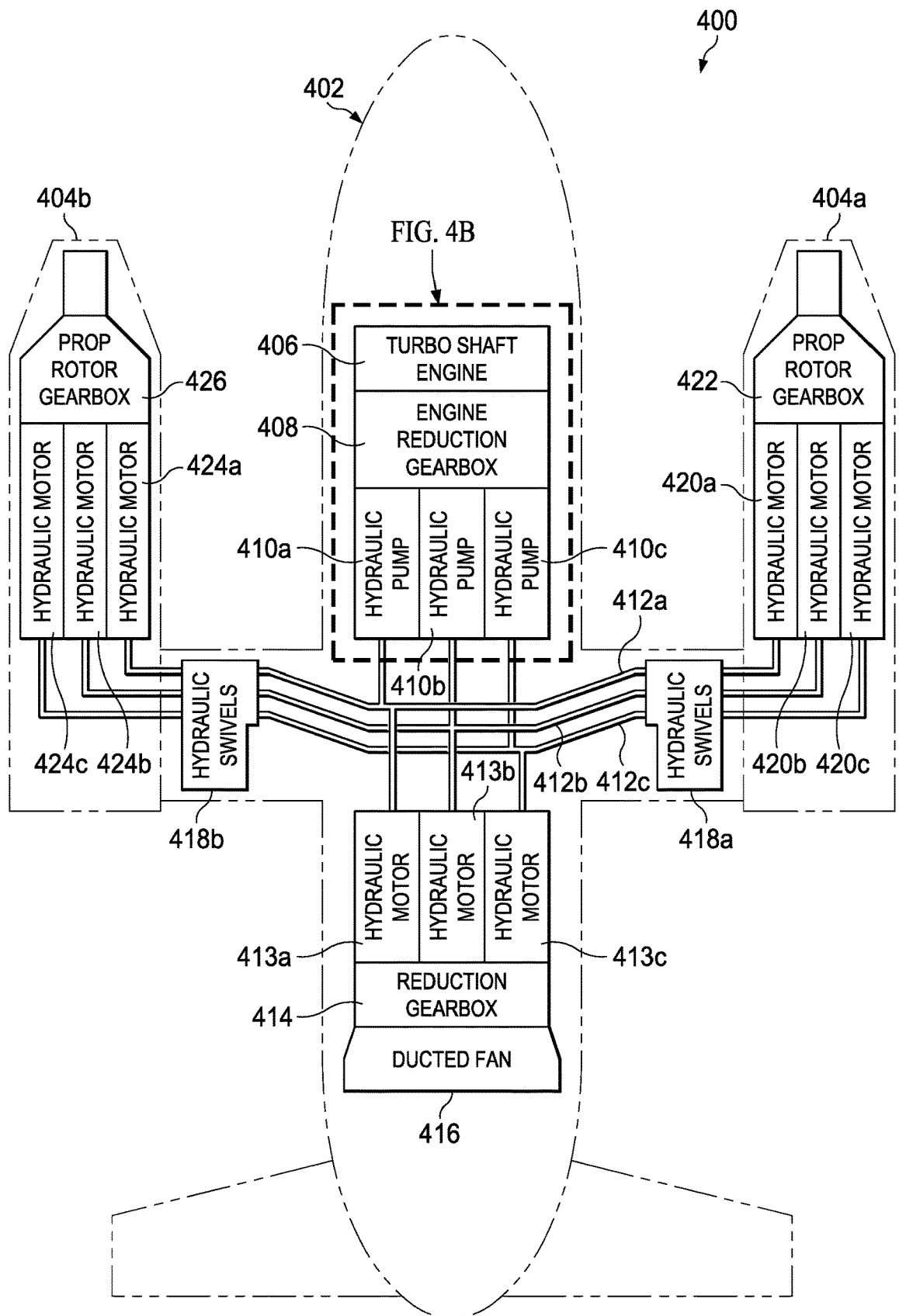

FIG. 4A shows a top-view of a hydraulic hybrid propulsion drive train system of the present invention that incorporates distributed propulsion to provide thrust for high speed and efficient forward flight using ducted fans. Aircraft 400 is depicted having a fuselage 402 and nacelles 404a, 404b. The fuselage 402 includes one or more engines 406, which is depicted in this embodiment as a single turbo shaft engine that is connected to an engine reduction gearbox 408. Of course, the skilled artisan will recognize that for purposes of redundancy the aircraft 400 can include more than one engine as depicted in the insert. The engine reduction gearbox 408 connected to one or more hydraulic pumps (in this version three hydraulic pumps 410a, 410b, and 410c are depicted) that convert shaft power from the turbo shaft engine 406 into hydraulic power. The hydraulic pumps 410a, 410b and 410c are connected, respectively, to hydraulic fluid conduits 412a, 412b, 412c. Hydraulic fluid conduit 412a is connected to hydraulic motors 413a, 420a and 424a. Hydraulic fluid conduit 412b is connected to hydraulic motors 413b, 420b and 424b. Hydraulic fluid conduit 412c is connected to hydraulic motors 413c, 420c and 424c. In certain embodiments, the aircraft 400 may be a tiltrotor aircraft and the nacelles 404a, 404b tilt, which can require, e.g., an hydraulic swivels 418a, 418b, respectively, to connect hydraulic fluid conduits 412a, 412b, 412c to the respective hydraulic motors. It is possible that the various hydraulic pumps 410a, 410b, 410c, power a single large hydraulic motor, however, for applications in which redundancy is preferred (such as manned aircraft), it will be common to include 1, 2, 3, 4, or more hydraulic motors. The number of hydraulic motors can be optimized by, e.g., factoring the weight of the hydraulic motor, the speed of the hydraulic motor, the torque of the hydraulic motor, the weight of the aircraft, etc. In this embodiment, the hydraulic motors 413a, 413b, and 413c are depicted as driving a reduction gearbox 414 that connected to a ducted fan 416 that is used to provide additional thrust to the aircraft 400. While the ducted fan 416 is depicted in this embodiment as being in the back of the aircraft 400, the skilled artisan will recognize that it may be positioned in front of the engine 406, adjacent to the engine 406 or may include more than one ducted fan 416, such as 1, 2, 3, 4, or more ducted fans. Turning to each of the nacelles 404a, 404b, each is depicted with three hydraulic motors, however the skilled artisan will recognize that the number of hydraulic motors can be varied depending on power-to-weight curves or restrictions, such as 1, 2, 3, 4, or more hydraulic motors. The hydraulic motors 420a, 420b and 420c are depicted in nacelles 404a connected to drive a prop rotor gearbox 422 that turns a proprotor (not depicted). Likewise, the hydraulic motors 424a, 424b and 424c are depicted in nacelles 404b to connect to and drive a prop rotor gearbox 426 that turns a proprotor (not depicted). Thus, the two nacelles 404a, 404b are used in a traditional manner as with all tiltrotor or vertical take off and landing craft to provide lift when the proprotors are parallel to the ground and upon take off will rotate to a position generally perpendicular to the flight during forward flight providing thrust. In certain embodiment, such as when the proprotors are foldable during flight, the proprotors may be used primarily for the initial take-off and landing, but the ducted fan 416 may provide addition thrust or be the primary or sole source of thrust during forward flight. FIG. 4B shows turbo shaft engine 406 in an expanded view that depicts two turbo shaft engines 430a, 430b, which connect to the engine reduction gearbox 408. The aircraft 400 may include 1, 2, 3, 4, or more engines. Of course, in certain embodiments the engines may be conventional jet engines or even standard combustion engines, so long as they provide shaft power to drive the reduction gearbox 414 that provides power to ducted fan 416.

The present invention also includes the combination of both electric generators connected to electric motors, and hydraulic pumps connected to hydraulic motors on the same aircraft. While generally only one type of torque-converting power will typically be used, it is possible that certain configurations, size, weight, and torque requirements may include at least one or more electric and one or more hydraulic system(s) in the same aircraft.

Figure 5A:
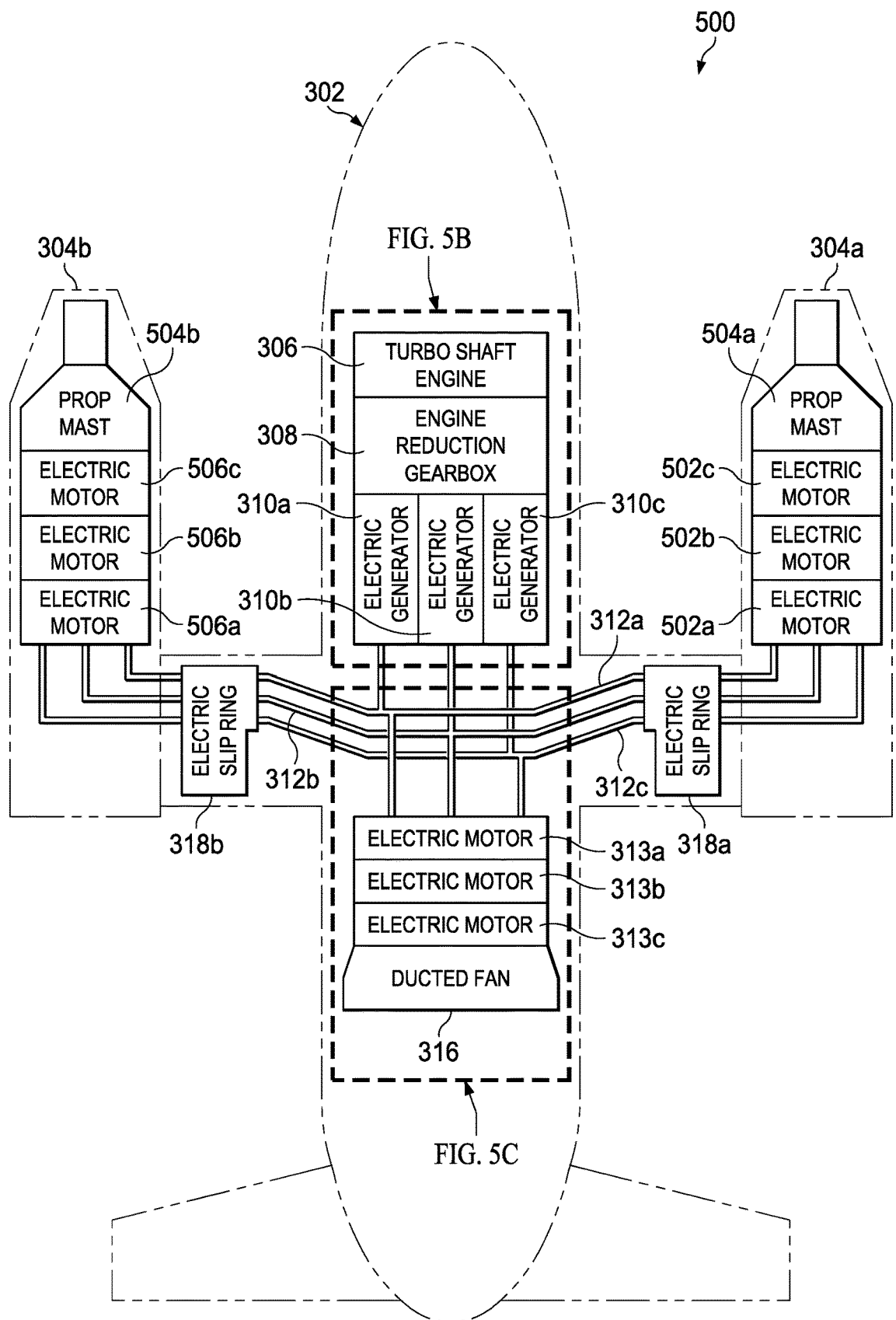
FIGS. 5A to 5C show top views of a tiltrotor high torque motor hybrid electric propulsion system of the present invention.
Figure 5B:
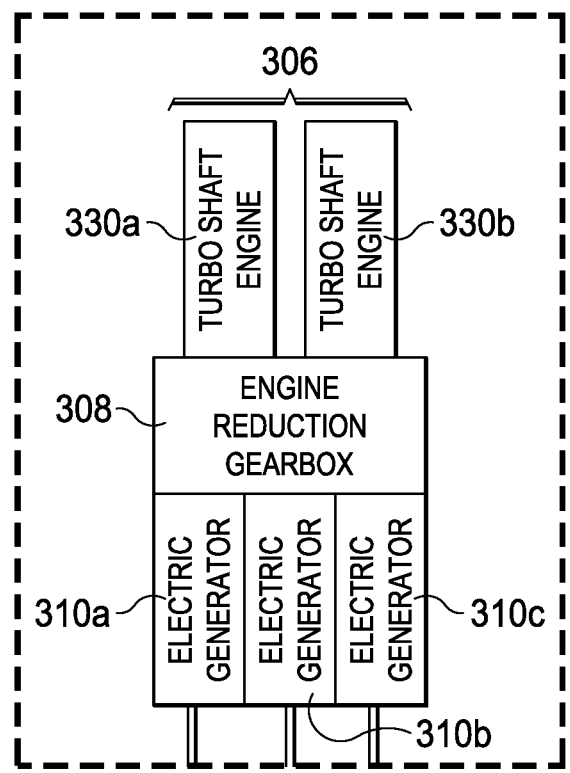
Figure 5C:
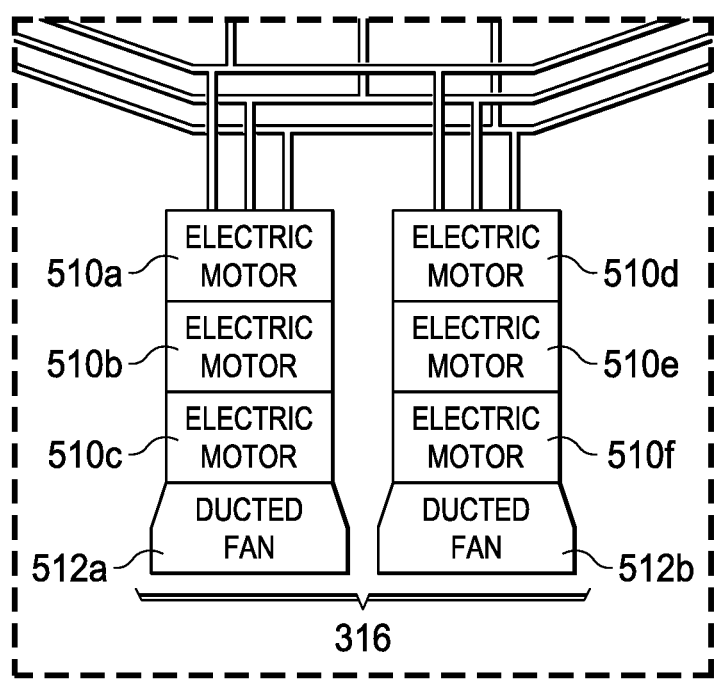

FIG. 5A shows a top-view of an electric hybrid propulsion drive train system of the present invention that incorporates distributed propulsion to provide thrust for high speed and efficient forward flight using ducted fans. Aircraft 500 is depicted having a fuselage 302 and nacelles 304a, 304b. The fuselage 302 includes one or more engines 306, which is depicted in this embodiment as a single turbo shaft engine that is connected to an engine reduction gearbox 308. Of course, the skilled artisan will recognize that for purposes of redundancy the aircraft 500 can include more than one engine as depicted in the insert. The engine reduction gearbox 308 connected to one or more electric generators (in this version three electric generators 310a, 310b, and 310c are depicted) that convert shaft power from the turbo shaft engine 306 into electrical power. The electric generators 310a, 310b, and 310c are connected, respectively, to power conduits 312a, 312b, 312c. Power conduit 312a is connected to electric motors 313a, 502a and 506a. Power conduit 312b is connected to electric motors 313b, 502b and 506b. Power conduit 312c is connected to electric motors 313c, 502c and 506c. In certain embodiments, the aircraft 500 may be a tiltrotor aircraft and the nacelles 304a, 304b tilt, which can require, e.g., an electric slip ring 318a, 318b, respectively, to connect power conduits 312a, 312b, 312c to the respective electric motors. It is possible that the various electric generators 310a, 310b, 310c, power a single large electric motor, however, for applications in which redundancy is preferred (such as manned aircraft), it will be common to include 1, 2, 3, 4, or more electric motors. The number of electric motors can be optimized by factoring the weight of the electric motor, the speed of the electric motor, the torque of the electric motor, the weight of the aircraft, etc. In this embodiment, the electric motors 313a, 313b, and 313c are directly connected to a ducted fan 316 that is used to provide additional thrust to the aircraft 500. While the ducted fan 316 is depicted in this embodiment as being in the back of the aircraft 500, the skilled artisan will recognize that it may be positioned in front of the engine 306, adjacent to the engine 306 or may include more than one ducted fan 316, such as 1, 2, 3, 4, or more ducted fans. Turning to each of the nacelles 304a, 304b, each is depicted with three electric motors, however the skilled artisan will recognize that the number of electric motors can be varied depending on power-to-weight curves or restrictions, such as 1, 2, 3, 4, or more electric motors. The electric motors 502a, 502b and 502c are depicted in nacelles 304a connected directly to the prop mast 504a. The electric motors 502a, 502b and 502c will be sized to provide partial or full torque to the prop mast 504a directly. Likewise, electric motors 506a, 506b and 506c are depicted in nacelles 304b connected directly to the prop mast 504b. FIG. 5B shows the turbo shaft engine 306 in an expanded view that depicts two turbo shaft engines 330a, 330b, that connect to the engine reduction gearbox. The aircraft 500 may include 1, 2, 3, 4, or more engines. Of course, in certain embodiments the engines may be conventional jet engines or even standard combustion engines, so long as they provide shaft power to drive the reduction gearbox 308. FIG. 5C shows that the ducted fan 316 can include, in this embodiment, two ducted fans 512a, 512b, which are respectively driven directly by electric motors, in the case of ducted fan 512a connected to electric motors 510a, 510b, 510c, and in the case of ducted fan 512b connected to electric motors 510d, 510e, 510f.

Figure 6A:
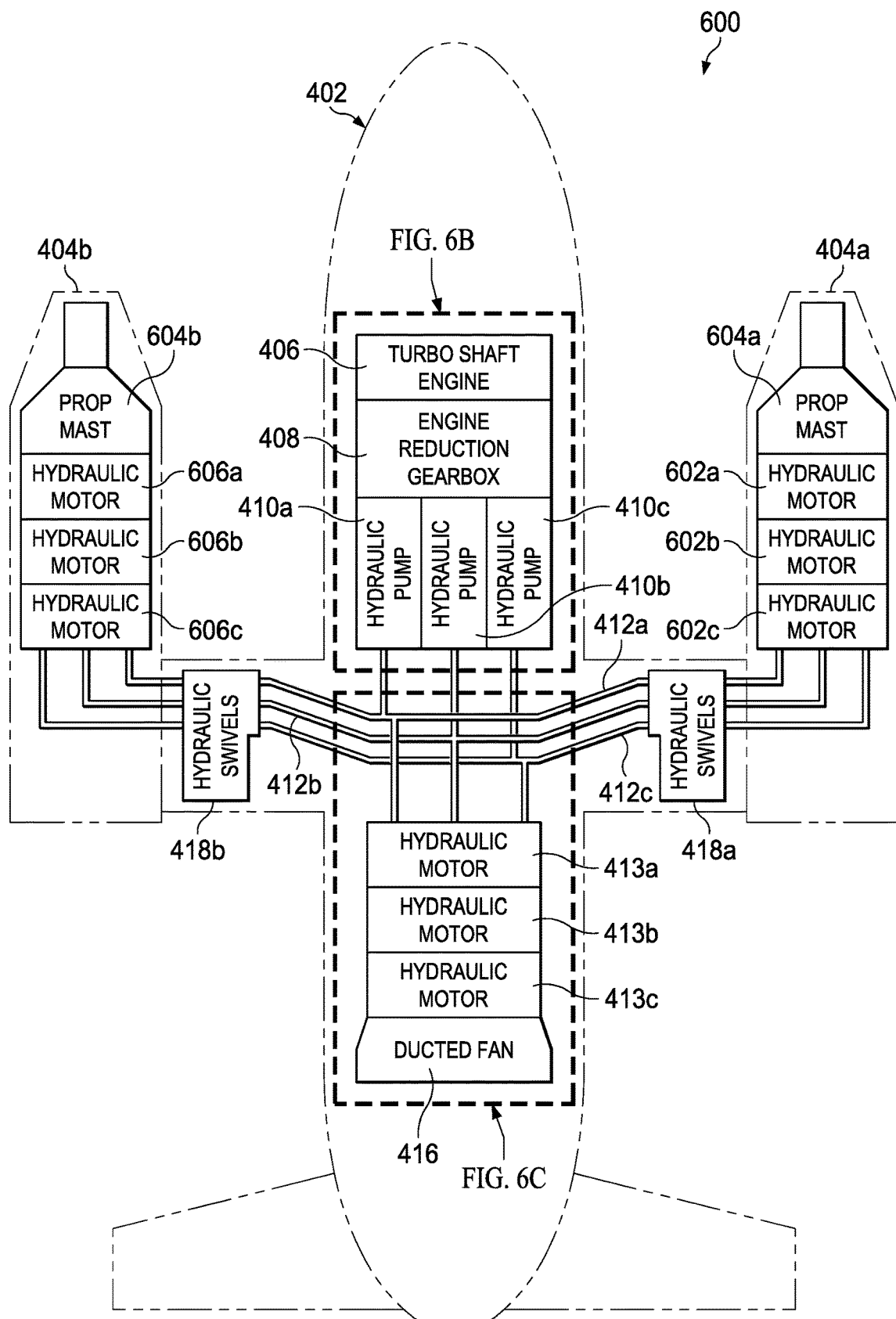
FIGS. 6A to 6C show top views of a tiltrotor high torque motor hybrid hydraulic propulsion system of the present invention.
Figure 6B:
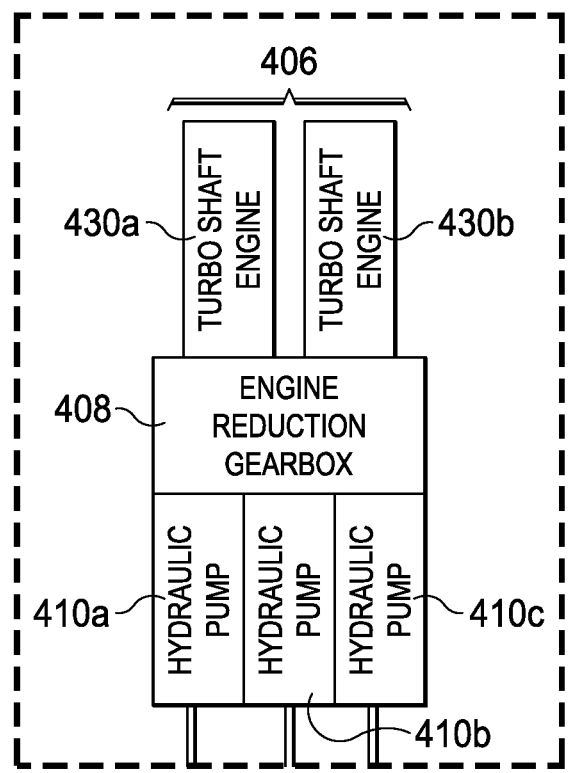
Figure 6C:
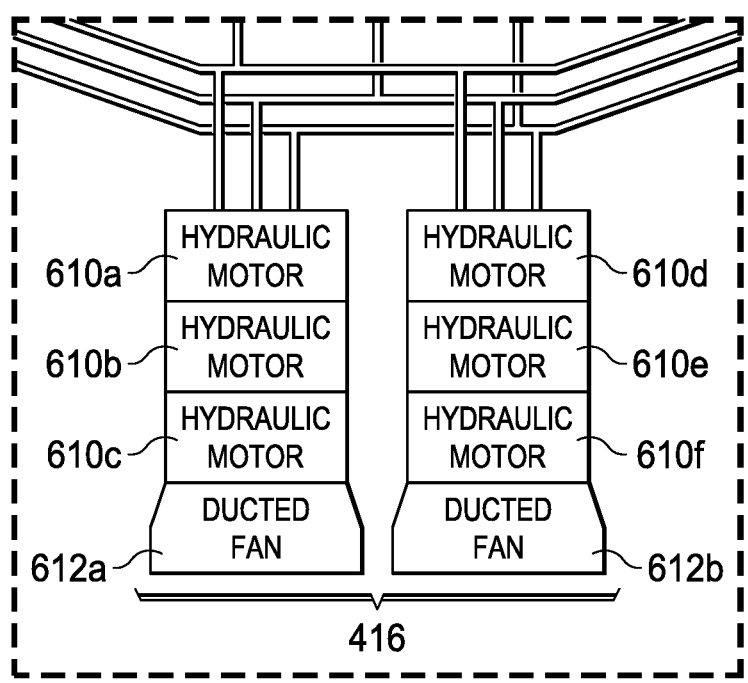

FIG. 6A shows a top-view of a hydraulic hybrid propulsion drive train system of the present invention that incorporates distributed propulsion to provide thrust for high speed and efficient forward flight using ducted fans. Aircraft 600 is depicted having a fuselage 402 and nacelles 404a, 404b. The fuselage 402 includes one or more engines 406, which is depicted in this embodiment as a single turbo shaft engine that is connected to an engine reduction gearbox 408. Of course, the skilled artisan will recognize that for purposes of redundancy the aircraft 600 can include more than one engine as depicted in the insert. The engine reduction gearbox 408 connected to one or more hydraulic pumps (in this version three hydraulic pumps 410a, 410b and 410c are depicted) that convert shaft power from the turbo shaft engine 406 into hydraulic power. The hydraulic pumps 410a, 410b and 410c are connected, respectively, to hydraulic fluid conduits 412a, 412b and 412c. Hydraulic fluid conduit 412a is connected to hydraulic motors 413a, 602a and 606a. Hydraulic fluid 412b is connected to hydraulic motors 413b, 602b and 606b. Hydraulic fluid 412c is connected to hydraulic motors 413c, 602c and 606c. In certain embodiments, the aircraft 600 may be a tiltrotor aircraft and the nacelles 404a, 404b tilt, which can require, e.g., a hydraulic swivels 418a, 418b, respectively, to connect hydraulic fluid conduits 412a, 412b and 412c to the respective hydraulic motors. It is possible that the various hydraulic pumps 410a, 410b, 410c, power a single large hydraulic motor, however, for applications in which redundancy is preferred (such as manned aircraft), it will be common to include 1, 2, 3, 4, or more hydraulic motors. The number of hydraulic motors can be optimized by, e.g., factoring the weight of the hydraulic motor, the speed of the hydraulic motor, the torque of the hydraulic motor, the weight of the aircraft, etc. In this embodiment, the hydraulic motors 413a, 413b and 413c are driving directly a ducted fan 416 that is used to provide additional thrust to the aircraft 600. While the ducted fan 416 is depicted in this embodiment as being in the back of the aircraft 600, the skilled artisan will recognize that it may be positioned in front of the engine 406, adjacent to the engine 406 or may include more than one ducted fan 416, such as 1, 2, 3, 4, or more ducted fans. Turning to each of the nacelles 404a, 404b, each is depicted with three hydraulic motors, however the skilled artisan will recognize that the number of hydraulic motors can be varied depending on power-to-weight curves or restrictions, such as 1, 2, 3, 4, or more hydraulic motors. The hydraulic motors 602a, 602b and 602c are depicted in nacelles 404a connected directly to the prop mast 604a. The hydraulic motors 602a, 602b and 602c will be sized to provide partial or full torque to the prop mast 604a directly. Likewise, hydraulic motors 606a, 606b and 606c are depicted in nacelles 404b connected directly to the prop mast 604b. FIG. 6B shows the turbo shaft engine 406 in an expanded view that depicts two turbo shaft engines 430a, 430b, that connect to the engine reduction gearbox 408. The aircraft 600 may include 1, 2, 3, 4, or more engines. Of course, in certain embodiments the engines may be conventional jet engines or even standard combustion engines, so long as they provide shaft power to drive the engine reduction gearbox 408. FIG. 6C shows that the ducted fan 416 can include, in this embodiment, two ducted fans 612a, 612b, which are respectively driven directly by hydraulic motors, in the case of ducted fan 612a connected to hydraulic motors 610a, 610b, 610c, and in the case of ducted fan 612b connected to hydraulic motors 610d, 610e, 610f.

Figure 7:
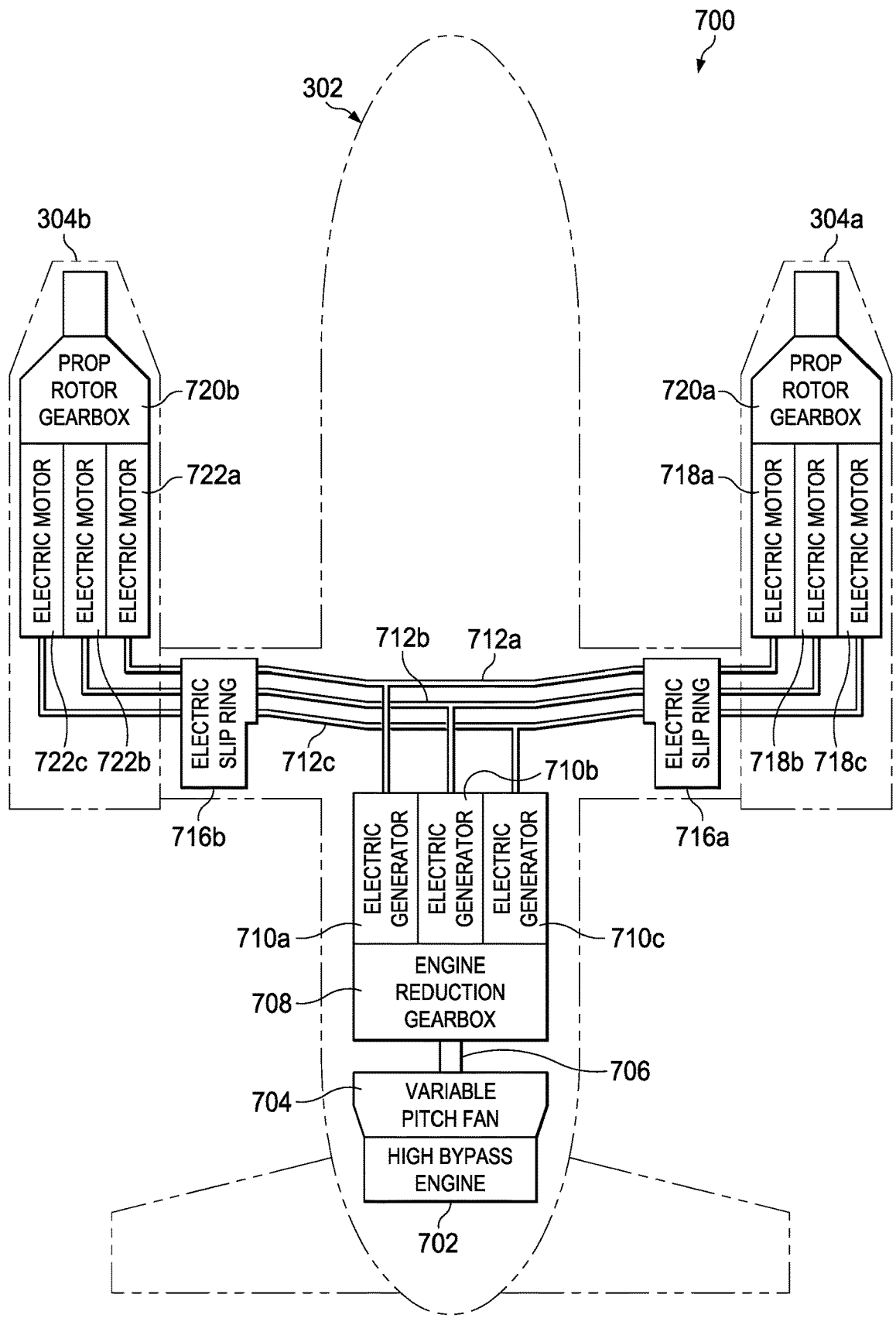
FIG. 7 shows a top view of a tiltrotor high bypass engine hybrid electric propulsion system of the present invention.

FIG. 7 shows a top-view of an electric hybrid propulsion drive train system of the present invention that incorporates distributed propulsion to provide thrust for high speed and efficient forward flight using ducted fans. Aircraft 700 is depicted having a fuselage 302 and nacelles 304a, 304b. The fuselage 302 includes one or more engines, which is depicted in this embodiment as a high bypass engine 702 that is connected by shaft 706 to an engine reduction gearbox 708. Of course, the skilled artisan will recognize that for purposes of redundancy the aircraft 700 can include more than one engine. The high bypass engine 702 can be connected directly or indirectly to a variable pitch fan 704, but also provide shaft power via shaft 706 to an engine reduction gearbox 708. The engine reduction gearbox 708 is connected to one or more electric generators (in this version three electric generators 710a, 710b and 710c are depicted) that convert shaft power from the high bypass engine 702 into electrical power. The electric generators 710a, 710b and 710c are connected, respectively, to power conduits 712a, 712b, 712c. Power conduit 712a is connected to electric motors 718a and 722a. Power conduit 712b is connected to electric motors 718b and 722b. Power conduit 712c is connected to electric motors 718c and 722c. In certain embodiments, the aircraft 700 may be a tiltrotor aircraft and the nacelles 304a, 304b tilt, which can require, e.g., an electric slip ring 716a, 716b, respectively, to connect power conduits 712a, 712b, 712c to the respective electric motors. It is possible that the various electric generators 710a, 710b, 710c, power a single large electric motor, however, for applications in which redundancy is preferred (such as manned aircraft), it will be common to include 1, 2, 3, 4, or more electric motors. The number of electric motors can be optimized by factoring the weight of the electric motor, the speed of the electric motor, the torque of the electric motor, the weight of the aircraft, etc. In this embodiment, the electric motors 718a, 718b and 718c are depicted as driving a proprotor reduction gearbox 720a that is connected to a proprotor (not depicted). While the variable pitch fan 704 is depicted in this embodiment as being in front of the high bypass engine 702, the skilled artisan will recognize that it may be positioned rearward from the high bypass engine 702. Further, while depicted as a single variable pitch fan 704, variable pitch fan 704 may include more than one ducted fan, such as 2, 3, 4, or more ducted fans, which can also be positioned adjacent the high bypass engine 702 or elsewhere on the aircraft 700. Turning to each of the nacelles 304a, 304b, each is depicted with three electric motors, however the skilled artisan will recognize that the number of electric motors can be varied depending on power-to-weight curves or restrictions, such as 1, 2, 3, 4, or more electric motors. The electric motors 718*a*, 718*b* and 718*c* are depicted in nacelles 304*a* connected to drive a proprotor reduction gearbox 720*a* that turns a proprotor (not depicted). Likewise, the electric motors 722*a*, 722*b* and 722*c* are depicted in nacelles 304*b* to connect to and drive a proprotor reduction gearbox 720*b* that turns a proprotor (not depicted). Thus, the two nacelles 304*a*, 304*b* are used in a traditional manner as with all tiltrotor or vertical take off and landing craft to provide lift when the proprotors are parallel to the ground and upon take off will rotate to a position generally perpendicular to the flight during forward flight providing thrust. In certain embodiments, such as when the proprotors are foldable during flight, the proprotors may be used primarily for the initial take-off and landing, but the variable pitch fan 704 may provide addition thrust or be the primary or sole source of thrust during forward flight.

Figure 8:
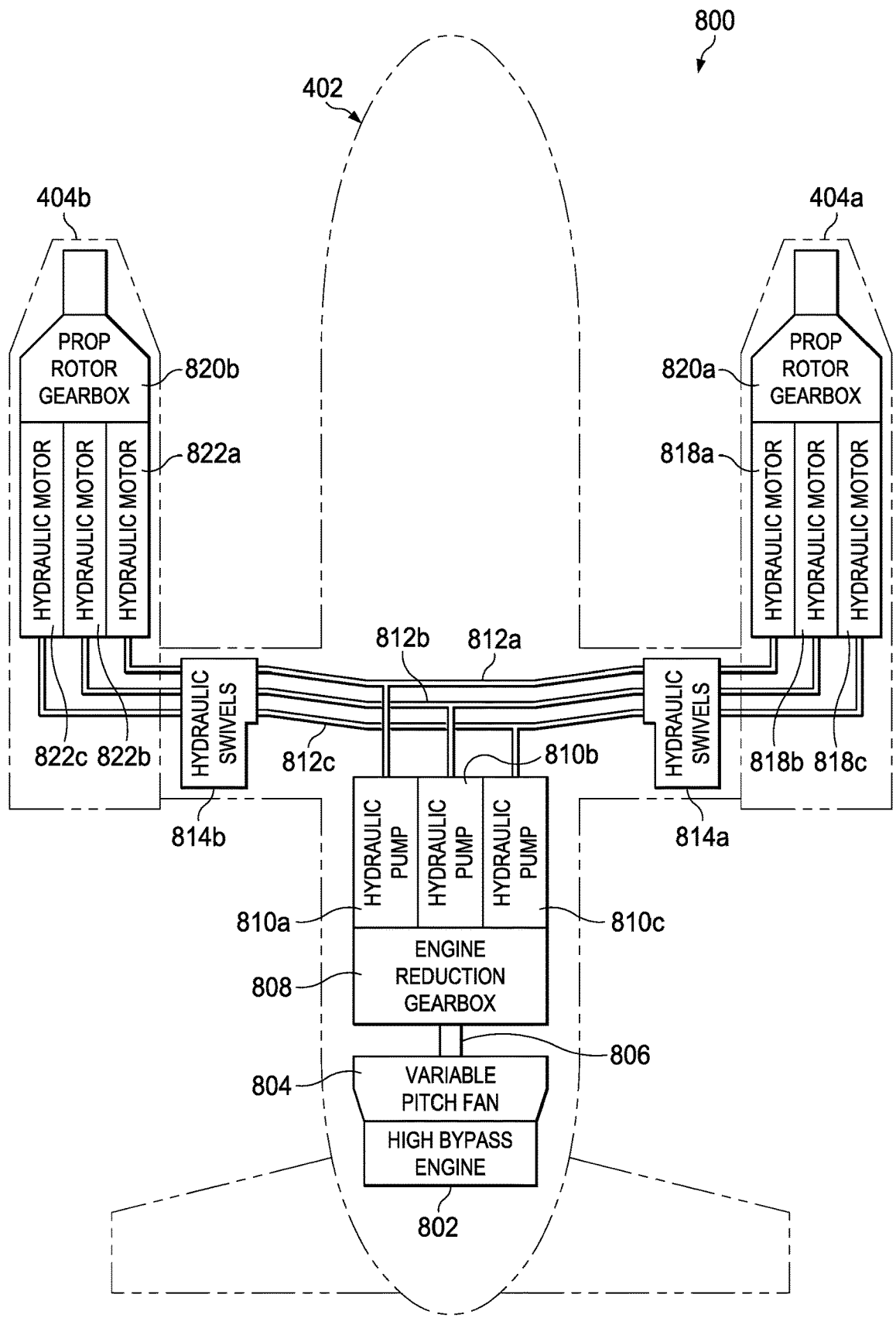
FIG. 8 shows a top view of a tiltrotor high bypass engine hybrid hydraulic propulsion system of the present invention.

FIG. 8 shows a top-view of a hydraulic hybrid propulsion drive train system of the present invention that incorporates distributed propulsion to provide thrust for high speed and efficient forward flight using ducted fans. Aircraft 800 is depicted having a fuselage 402 and nacelles 404*a*, 404*b*. The fuselage 402 includes one or more engines, which is depicted in this embodiment as a high bypass engine 802 that is connected by a shaft 806 to an engine reduction gearbox 808. Of course, the skilled artisan will recognize that for purposes of redundancy the aircraft 800 can include more than one engine. The high bypass engine 802 can be connected directly or indirectly to a variable pitch fan 804, but also provide shaft power via shaft 806 to an engine reduction gearbox 808. The engine reduction gearbox 808 is connected to one or more hydraulic pumps (in this version three hydraulic pumps 810*a*, 810*b* and 810*c* are depicted) that convert shaft power from the high bypass engine 802 into hydraulic power. The hydraulic pumps 810*a*, 810*b* and 810*c* are connected, respectively, to hydraulic conduits 812*a*, 812*b*, 812*c*. Hydraulic conduit 812*a* is connected to hydraulic motors 818*a* and 822*a*. Hydraulic conduit 812*b* is connected to hydraulic motors 818*b* and 822*b*. Hydraulic conduit 812*c* is connected to hydraulic motors 818*c* and 822*c*. In certain embodiments, the aircraft 800 may be a tiltrotor aircraft and the nacelles 404*a*, 404*b* tilt, which can require, e.g., hydraulic swivels 814*a*, 814*b*, respectively, to connect hydraulic conduits 812*a*, 812*b*, 812*c* to the respective hydraulic motors. It is possible that the various hydraulic pumps 810*a*, 810*b*, 810*c*, power a single large hydraulic motor, however, for applications in which redundancy is preferred (such as manned aircraft), it will be common to include 1, 2, 3, 4, or more hydraulic motors. The number of hydraulic motors can be optimized by factoring the weight of the hydraulic motor, the speed of the hydraulic motor, the torque of the hydraulic motor, the weight of the aircraft, etc. In this embodiment, the hydraulic motors 818*a*, 818*b* and 818*c* are depicted as driving a reduction gearbox 820*a* that connected to a proprotor (not depicted). While the variable pitch fan 804 is depicted in this embodiment as being in front of the high bypass engine 802, the skilled artisan will recognize that it may be positioned rearward from the high bypass engine 802. Further, while depicted as a single variable pitch fan 804, variable pitch fan 804 may include more than one ducted fan, such as 2, 3, 4, or more ducted fans, which can also be positioned adjacent the high bypass engine 802 or elsewhere on the aircraft 800. Turning to each of the nacelles 404*a*, 404*b*, each is depicted with three hydraulic motors, however the skilled artisan will recognize that the number of hydraulic motors can be varied depending on power-to-weight curves or restrictions, such as 1, 2, 3, 4, or more hydraulic motors. The hydraulic motors 818*a*, 818*b* and 818*c* are depicted in nacelles 404*a* connected to drive a prop rotor reduction gearbox 820*a* that turns a proprotor (not depicted). Likewise, the hydraulic motors 822*a*, 822*b* and 822*c* are depicted in nacelles 404*b* to connect to and drive a prop rotor reduction gearbox 820*b* that turns a proprotor (not depicted). Thus, the two nacelles 404*a*, 404*b* are used in a traditional manner as with all tiltrotor or vertical take off and landing craft to provide lift when the proprotors are parallel to the ground and upon take off will rotate to a position generally perpendicular to the flight during forward flight providing thrust. In certain embodiment, such as when the proprotors are foldable during flight, the proprotors may be used primarily for the initial take-off and landing, but the variable pitch fan 804 may provide addition thrust or be the primary or sole source of thrust during forward flight.

In certain additional embodiments, the present invention may be a hybrid propulsion drive train system in which a stop-fold tiltrotor converts from helicopter to high-speed airplane mode, as follows: (a) conversion from helicopter to low speed airplane mode: generators/pumps transmit power to proprotor electric/hydraulic motors as pylons are rotated into airplane mode and speed is increased; (b) one or more ducted fans are not powered to reduce forward thrust; and/or (c) conversion from low to high speed airplane mode: generators/pumps provide increasing power to ducted fans to generate forward thrust as power to proprotors is decreased to zero. If the proprotors are stop-fold tiltrotors, the proprotors are folded during forward flight to reduce drag. Providing power for stopping and setting to folding proprotor folding index position can be provided by the proprotor electric/hydraulic motors. Finally, in full forward flight, power to the ducted fans is increased to allow for maximum speed.

Thus, in addition to the configurations described in FIGS. 3A and 4A using high-speed electric and hydraulic motors, additional implementations of hybrid propulsion drive train systems are possible utilizing high torque electric and hydraulic motors. As shown in FIG. 5A for high torque electric and FIG. 6A for high torque hydraulic hybrid propulsion drive train systems, incorporation high torque motor technology allows for the elimination of prop rotor and ducted fan reduction gearboxes. Elimination of prop rotor and ducted fan reduction gearboxes improves aircraft reliability and reduces weight. Another implementation of hybrid propulsion drive train systems is possible utilizing a high bypass jet engine with a variable pitch fan combined with either electric or hydraulic motors. As shown in FIG. 7 for electric and FIG. 8 for hydraulic hybrid propulsion drive train systems, incorporation variable pitch fan high bypass engine technology allows for the elimination of the ducted fan reduction gearbox and drive motors. In helicopter mode, power to a bypass fan would be minimized by reducing the pitch of the fan blade or the inlet vane, while the engine core maintains required airflow. Unloading the turbofan from the generators or pumps in high-speed airplane mode is the same as other configuration. The skilled artisan will recognize that for certain specific purposes, the aircraft may combine any of the embodiments depicted in FIGS. 3A, 4A, 5A, 6A, 7 and 8 in a single aircraft. The aircraft may also include a stop-fold tiltrotor.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A hybrid propulsion system for an aircraft, the hybrid propulsion system comprising:
    an engine disposed within a fuselage of the aircraft;
    two electrical generators disposed within the fuselage and connected to the engine;
    two nacelles, each nacelle comprising a proprotor, and each nacelle housing two electric motors connected to the proprotor;
    wherein each electrical generator is connected to the two electric motors in each nacelle;
    wherein the proprotors provide lift for vertical takeoff and landing in a helicopter mode; and
    a fan coupled to the fuselage and connected to two additional electric motors, each additional electric motor connected to one of the two electric generators, wherein the fan provides thrust for forward flight during an airplane mode;
    wherein the airplane mode includes increasing power to the fan while decreasing power to the proprotors to zero.

2. The hybrid propulsion system of claim 1, wherein each of the two nacelles are rotatable.

3. The hybrid propulsion system of claim 1, wherein the engine is a turboshaft engine, high bypass engine or distributed engine.

4. The hybrid propulsion system of claim 1, further comprising a reduction gearbox positioned between the engine and the two electrical generators.

5. The hybrid propulsion system of claim 1, further comprising a proprotor reduction gearbox positioned between the two electrical motors and the proprotor of each nacelle.

6. The hybrid propulsion system of claim 1, wherein the proprotors are driven directly by the two electrical motors.

7. The hybrid propulsion system of claim 1, wherein the engine is not mechanically connected to the fan.

8. A method of providing propulsion to an aircraft, the method comprising:
- providing an engine disposed within a fuselage of the aircraft;
- providing two electrical generators disposed within the fuselage and connected to the engine;
- providing two nacelles, each nacelle comprising a proprotor, and each nacelle housing two electric motors connected to the proprotor;
- providing a fan coupled to the fuselage and connected to two additional electric motors, and each additional electric motor connected to the two electric generators;
- driving the two electrical generators with the engine;
- generating an electrical power from the two electrical generators;
- transmitting the electrical power to the electric motors in the nacelles;
- rotating the proprotors using the electrical motors in the nacelles to provide lift for vertical takeoff and landing in a helicopter mode; and
- rotating the fan using the additional electric motors to provide thrust for forward flight during an airplane mode, wherein the airplane mode includes increasing power to the fan while decreasing power to the proprotors.

9. The method of claim 8, wherein each of the two nacelles are rotatable.

10. The method of claim 8, wherein the engine is a turboshaft engine, high bypass engine or distributed engine.

11. The method of claim 8, further comprising providing a reduction gearbox positioned between the engine and the two electrical generators.

12. The method of claim 8, further comprising providing a proprotor reduction gearbox positioned between the two electrical motors and the proprotor of each nacelle.

13. The method of claim 8, wherein the proprotors are driven directly by the two electrical motors.

14. The method of claim 8, wherein the engine is not mechanically connected to the fan.

15. A tiltrotor craft comprising:
- a fuselage;
- an engine disposed within the fuselage;
- two electrical generators disposed within the fuselage, each electrical generator connected to the engine;
- two wings connected to the fuselage;
- two rotatable nacelles, each rotatable nacelle disposed on a respective wing and comprising:
  - a proprotor disposed at a forward end of the rotatable nacelle to provide lift for vertical takeoff and landing and for stationary flight in a helicopter mode and thrust for forward flight in a first airplane mode, and to provide a reduced thrust during a second airplane mode; and
  - two electric motors disposed within the rotatable nacelle and connected to the proprotor, each electric motor connected to the two electric generators; and
- a fan disposed within the fuselage and connected to two additional electric motors disposed within the fuselage, each additional electric motor connected to the two electric generators, wherein the fan is powered and provides forward thrust for forward flight during the second airplane mode;
- wherein the first airplane mode is converted to the second airplane mode by increasing power to the fan while decreasing power to the proprotors to zero; and
- wherein the second airplane mode is converted to the first airplane mode by decreasing power to the fan while increasing power to the proprotors.

16. The tiltrotor craft of claim 15, wherein the engine is a turboshaft engine, high bypass engine or distributed engine.

17. The tiltrotor craft of claim 15, further comprising a reduction gearbox positioned between the engine and the two electrical generators.

18. The tiltrotor craft of claim 15, further comprising a proprotor reduction gearbox positioned between the two electrical motors and the proprotor of each nacelle.

19. The tiltrotor craft of claim 15, wherein the proprotors are driven directly by the two electrical motors.

20. The tiltrotor craft of claim 15, wherein the engine is not mechanically connected to the fan.

\* \* \* \* \*